United States Patent
Odendall

(10) Patent No.: US 9,719,399 B2
(45) Date of Patent: Aug. 1, 2017

(54) METHOD OF OPERATING AN EXHAUST EMISSION CONTROL DEVICE, AND CORRESPONDING EXHAUST EMISSION CONTROL DEVICE

(71) Applicant: AUDI AG, Ingolstadt (DE)

(72) Inventor: Bodo Odendall, Lenting (DE)

(73) Assignee: AUDI AG, Ingolstadt (DE)

( * ) Notice: Subject to any disclaimer, the term of this patent is extended or adjusted under 35 U.S.C. 154(b) by 117 days.

(21) Appl. No.: 14/973,028

(22) Filed: Dec. 17, 2015

(65) Prior Publication Data
US 2016/0186636 A1    Jun. 30, 2016

(30) Foreign Application Priority Data

Dec. 31, 2014  (DE) .................. 10 2014 019 642

(51) Int. Cl.
*F01N 11/00* (2006.01)
*F01N 3/021* (2006.01)
(Continued)

(52) U.S. Cl.
CPC .............. *F01N 11/00* (2013.01); *F01N 3/021* (2013.01); *F01N 9/002* (2013.01); *F01N 11/002* (2013.01); *F01N 3/023* (2013.01); *F01N 9/005* (2013.01); *F01N 2550/04* (2013.01); *F01N 2550/24* (2013.01); *F01N 2560/08* (2013.01); *F01N 2560/14* (2013.01); *F01N 2900/0404* (2013.01); *F01N 2900/0418* (2013.01);
(Continued)

(58) Field of Classification Search
CPC .......... F01N 3/021; F01N 9/002; F01N 9/005; F01N 11/00; F01N 2550/04; F01N 2550/24; F01N 2560/08; F01N 2900/0404; F01N 2900/0418; F01N 2900/0422; F01N 2900/08; F01N 2900/1404; F01N 2900/1406; F01N 2900/1411; F01N 2900/1606
USPC .......................... 60/274, 277, 295, 297, 311
See application file for complete search history.

(56) References Cited

U.S. PATENT DOCUMENTS

| 5,715,678 A | 2/1998 | Aronica et al. |
| 2005/0138921 A1* | 6/2005 | Hashimoto ........... F01N 13/017 60/297 |

(Continued)

FOREIGN PATENT DOCUMENTS

| DE | 695 19 274 | 11/2000 |
| DE | 10 2007 042 420 | 1/2009 |

(Continued)

OTHER PUBLICATIONS

European Search Report issued on Apr. 28, 2016 with respect to counterpart European patent application EP 15 00 3512.
Translation of European Search Report issued on Apr. 28, 2016 with respect to counterpart European patent application EP 15 00 3512.

*Primary Examiner* — Jorge Leon, Jr.
(74) *Attorney, Agent, or Firm* — Henry M. Feiereisen LLC

(57) ABSTRACT

In a method of operating an exhaust emission control device, the presence of an actual pressure loss of a particulate filter is determined, and a model pressure loss is determined as a function of a state variable. On the basis of the actual pressure loss and the model pressure loss a pressure quotient is determined and a condition of the particulate filter is ascertained in a diagnostic mode in response to the pressure quotient.

8 Claims, 2 Drawing Sheets

(51) Int. Cl.
  *F01N 9/00* (2006.01)
  *F01N 3/023* (2006.01)
(52) U.S. Cl.
  CPC .. *F01N 2900/0422* (2013.01); *F01N 2900/08* (2013.01); *F01N 2900/1406* (2013.01); *F01N 2900/1606* (2013.01); *Y02T 10/47* (2013.01)

(56) References Cited

U.S. PATENT DOCUMENTS

| | | |
|---|---|---|
| 2005/0268597 A1 | 12/2005 | Kosaka |
| 2012/0023911 A1 * | 2/2012 | Liu .................. F01N 11/002 60/277 |
| 2012/0031075 A1 | 2/2012 | Odendall |
| 2012/0053816 A1 | 3/2012 | Odendall |
| 2014/0033679 A1 | 2/2014 | Sarsen et al. |
| 2014/0370606 A1 | 12/2014 | Odendall |

FOREIGN PATENT DOCUMENTS

| | | | |
|---|---|---|---|
| DE | 10 2010 030 633 | 12/2011 | |
| DE | 10 2010 038 189 | 4/2012 | |
| DE | 10 2013 214 653 | 2/2014 | |
| DE | 10 2014 209 840 | 11/2015 | |
| EP | 1 316 693 | 4/2003 | |
| FR | 2829798 A1 * | 3/2003 | ............. F01N 3/023 |
| FR | EP 1316693 A1 * | 6/2003 | ............. F01N 3/035 |
| JP | 2004-308454 | 11/2004 | |
| WO | WO 2006/111675 | 10/2006 | |

* cited by examiner

METHOD OF OPERATING AN EXHAUST EMISSION CONTROL DEVICE, AND CORRESPONDING EXHAUST EMISSION CONTROL DEVICE

CROSS-REFERENCES TO RELATED APPLICATIONS

This application claims the priority of German Patent Application, Serial No. 10 2014 019 642.9, filed Dec. 31, 2014, pursuant to 35 U.S.C. 119(a)-(d), the disclosure of which is incorporated herein by reference in its entirety as if fully set forth herein.

BACKGROUND OF THE INVENTION

The present invention relates to a method of operating an exhaust emission control device, and to a corresponding exhaust emission control device.

The following discussion of related art is provided to assist the reader in understanding the advantages of the invention, and is not to be construed as an admission that this related art is prior art to this invention.

An exhaust emission control device finds application, for example, in a drive device, especially of a motor vehicle. The drive device has an exhaust-producing device, e.g. an internal combustion engine. Emission produced during operation of the drive device is emitted, normally to the outside environment of the drive device. The exhaust emission control device is hereby used to receive and purge exhaust gas from the exhaust-producing device before being released into the surrounding atmosphere.

An exhaust emission control device includes a particulate filter by which particles contained in the exhaust are filtered out. This means, particles, e.g. soot particles or the like, collect in the particulate filter. When the load of the particulate filter with the particles reaches a limit, a regeneration mode is initiated by which the temperature of the particulate filter is increased sufficient to burn the particles or soot particles. While the regeneration mode causes a burning of the particles, there is still the problem that ash which has been produced during burning, still remains in the particulate filter. This ash cannot be carried away from the particulate filter during operation of the exhaust emission control device and/or during the regeneration mode.

The particulate filter, in particular the fill level of the particulate filter, is typically monitored by pressure sensors which determine the actual pressure loss across the particulate filter. For example, a first pressure sensor is arranged upstream of the particulate filter and a second pressure sensor is arranged downstream of the particulate filter to measure the respective actual pressures from which the actual pressure loss is computed, and based on the computed actual pressure loss, conclusion is supposed to be derived about the state of the particulate filter. This, however, is not reliable.

It would therefore be desirable and advantageous to provide an improved method of operating an exhaust emission control device to obviate prior art shortcomings and in particular to enable a reliable diagnosis about the condition of the particulate filter.

SUMMARY OF THE INVENTION

According to one aspect of the present invention, a method of operating an exhaust emission control device includes determining the presence of an actual pressure loss across a particulate filter, determining a model pressure loss as a function of a state variable, determining a pressure quotient as a function of the actual pressure loss and the model pressure loss, and ascertaining a condition of the particulate filter in a diagnostic mode in response to the pressure quotient.

The present invention resolves prior art problems by determining a model pressure loss in addition to measuring an actual pressure loss. This involves the use of at least one state variable. Advantageously, the model pressure loss describes the pressure loss across the particulate filter, independently of its condition or load. Thus, the model pressure loss describes the pressure loss of a new, non-loaded and fully operational particulate filter in dependence on the state variable. The state variable may, for example, involve an exhaust mass flow, an exhaust temperature, or the like. Advantageously, several or all of suitable state variables may be used in the determination of the model pressure loss.

After determination of the model pressure loss, the actual pressure loss is correlated to the model pressure loss. For this purpose, the pressure quotient is determined which can be calculated through division of the actual pressure loss by the model pressure loss. The pressure quotient thus reflects the ratio between the actual pressure loss and the model pressure loss theoretically experienced when the particulate filter is not loaded by any particles. Based on the pressure quotient, the condition of the particulate filter can thus be reliably ascertained.

According to another advantageous feature of the present invention, an actual value can be associated with the actual pressure loss and/or a model value can be associated with the model pressure loss, with the pressure quotient being a quotient of actual value and model value. The measured actual pressure value is thus temporarily stored in the form of the actual value and/or the modeled model pressure value in the form of the model value. Then, the pressure quotient is computed by calculating the quotient of actual value and model value, with the pressure quotient being established as the result of the division of the actual value by the model value.

According to another advantageous feature of the present invention, the model value and/or the actual value can be filtered by a bandpass filter before determining the pressure quotient. Thus, either the model value, or the actual value, or both, the model value and the actual value, may undergo filtering via a bandpass filter. The bandpass filter is capable to filter out in the frequency range of the model value and/or the actual value low and high frequencies. By filtering out the low frequencies, the signal is liberated from the mean value and thus in particular from an offset or offset error. As a result, structure tolerances and/or dynamic operating states are prevented from adversely affecting the direct formation of the pressure quotient from actual value and model value. Any impact of structure tolerances on the pressure sensors for example can be eliminated. In particular, an offset error of the pressure sensors is corrected. Moreover, the negative effect of a temperature drift of the pressure sensors on the outcome of the test to check the condition of the particulate filter can be excluded. Filtering out high frequencies reduces any interference that may be caused by signal noise for example.

According to another advantageous feature of the present invention, the bandpass filter can have a lower limit of a passband range of 0.1. Hz to 1 Hz and/or an upper limit of the passband range of 1 Hz to 10 Hz. As described above, the bandpass filter filters out both, low and high frequencies.

The bandpass filter is permeable solely within the passband range, as defined between the upper limit and the lower limit. The bandpass thus filters out all frequencies below the lower limit and/or above the upper limit. The lower limit of the passband range may involve values from 0.1 Hz to 1 Hz, for example from 0.4 Hz to 0.7 Hz or from 0.5 Hz to 0.6 Hz. The upper limit of the passband range may involve values from 1 Hz to 10 Hz, for example from 3 Hz to 8 Hz or from 5 Hz to 6 Hz.

According to another advantageous feature of the present invention, the model value and/or the actual value can be sign-corrected or squared before determining the pressure quotient. Thus, a mathematical function may respectively be applied to either the model value, or the actual value, or both, the model value and the actual value, before determination of the pressure quotient. The sign correction of the model value and/or the actual value, i.e. the formation of the respective absolute value, is hereby executed. As an alternative, squaring of the model value and/or the actual value may enter the mathematic equation. This leads also to a sign correction. Of course, other mathematical functions may be considered, so long as they effect a sign correction of the model value and/or the actual value.

According to another advantageous feature of the present invention, a model integral value is formed from the model value as a function of time and/or an actual integral value is formed from the actual value as a function of time, with the pressure quotient being a quotient of the actual integral value and the model integral value. The pressure quotient is thus not equated with the quotient of actual value and model value, but rather is equated to the quotient of the respectively integrated values, namely the actual integral value and the model integral value. The model integral value is formed through integration of the model value over time. Likewise, the actual integral value is formed through integration of the actual value over time. Any adverse effect as a result of momentary interferences can thus be minimized through integration of the model value and/or actual value.

Integration of the model value to the model integral value and/or integration of the actual value to the actual integral value can be executed in particular when one of the following conditions is met: The exhaust mass flow changes, the exhaust temperature exceeds a first temperature threshold value, the exhaust temperature drops below a second temperature threshold value, the exhaust mass flow exceeds a first mass flow threshold value, the exhaust mass flow is smaller than a first mass flow threshold value, an exhaust mass flow integral is greater than a threshold value of an exhaust mass flow integral. The presence of one of the afore-mentioned conditions may already be sufficient, although it is currently preferred that several or all of the conditions are met. So long as the condition or the conditions are not met, integration is suspended so that the actual integral value and/or the model integral value remain at their current values.

The exhaust mass flow is the mass flow of exhaust gas flowing through the emission control device. Integration is executed only when the exhaust mass flow has changed during the time interval over which integration is executed. Advantageously, the second temperature threshold value is greater than the first temperature threshold value. Likewise, the second exhaust mass flow threshold value is greater than the first exhaust mass flow threshold value. The exhaust mass flow integral is the time integral of the exhaust mass flow, suitably since last start of operation. When the exhaust mass flow integral has reached an adequate value, i.e. the exhaust mass flow integral exceeds the exhaust mass flow integral threshold value, it can be concluded that a useful determination of the actual integral value and/or the model integral value is possible.

According to another advantageous feature of the present invention, the presence of a mechanical defect of the particulate filter or a removal of the particulate filter can be assumed, when the pressure quotient is less than a first limit value. When the pressure quotient is less than 1, the actual pressure value, determined by the pressure sensors, is smaller that the model pressure loss that corresponds to an ideal non-loaded particulate filter. When the pressure quotient drops below the first limit value, it follows that the particulate filter is defective, in particular has a mechanical defect, or has been removed and thus is not positioned between the pressure sensors. The term "mechanical defect" relates hereby, for example, to a perforation of the particulate filter. Currently preferred is a first limit value of smaller than or equal to 1. Examples includes maximal 0.9, maximal 0.8, maximal 0.7, maximal 0.6, maximal 0.5, maximal 0.4, maximal 0.3, maximal 0.2, or maximal 0.1.

According to another advantageous feature of the present invention, the presence of a high load of the particulate filter can be assumed, when the pressure quotient exceeds a second limit value. Advantageously, the second limit value is greater than or equal to 1. For example, the second limit value is greater than 1.1, greater than 1.2, greater than 1.3, greater than 1.4, greater than 1.5, greater than 1.75, greater than 2.0, greater than 2.5, or greater than 3.0. In the presence of such a pressure quotient, it can be concluded that the particulate filter is highly loaded with particles, especially soot particles and/or ash particles.

When the particulate filter is highly loaded, it is provided for example to execute a regeneration mode. Thus, when the pressure quotient is greater than the second limit value, the regeneration mode is rapidly, especially immediately, initiated. During the regeneration mode, particles in the particulate filter are burned for example to decrease the load. Provision may be made to form a differential between the pressure quotient prior to regeneration mode and a pressure quotient after the regeneration mode. When the difference is smaller than a differential threshold, the presence of a clogged particulate filter can be assumed.

As described above, ash accumulates during the regeneration mode and remains in the particulate filter. As soon as the particulate filter is clogged with ash or the load is excessive, replacement of the particulate filter is required. Advantageously, a driver or a motor vehicle is alerted about the presence of a clogged particulate filter.

According to another advantageous feature of the present invention, the diagnostic mode is executed in the presence of at least one of the following conditions: an observation time exceeds a minimum observation time, an integration time period exceeds a minimum integration time period, a drive torque of a drive device exceeds a minimum torque, a drive torque of a drive device is smaller than a maximum torque, a rotation speed of the drive device exceeds a minimum rotation speed, and a rotation speed of the drive device is smaller than a maximum rotation speed. Conclusion about the condition of the particulate filter is advantageously made only in the diagnostic mode in response to the pressure quotient. Conversely, determination of the actual pressure loss with the aid of the pressure sensors, determination of the model pressure loss with the aid of the at least one state variable, and the following determination of the pressure quotient are advantageously carried out regularly, especially continuously.

The diagnostic mode is executed for example only when certain preconditions point to an expectation that a successful diagnostic of the particulate filter is possible. Parameters, like for example the observation time, the drive torque and/or the rotation speed, are hereby considered. In the presence of one or more, advantageously all, of the mentioned parameters in a certain range, the diagnostic mode is initiated or executed.

In particular, it is required that the observation time exceeds the minimum observation time to provide an adequate data base for diagnostics. For example, the observation time starts to run whenever the exhaust emission control device is operated, i.e. exhaust gas streams through the particulate filter. A further prerequisite can involve a check as to whether the integration time period exceeds the minimum integration time period. The integration time period corresponds to the one time period during which integration of actual value and/or model value to actual integral value or model integral value has been carried out. The integration time period thus corresponds to the summed time intervals during which integration has been executed.

In addition, or as an alternative, it may be necessary for the drive torque to lie between the minimum torque and the maximum torque, which differ from one another. Advantageously, the minimum torque is greater than 0, whereas the maximum torque is greater than the minimum torque. Moreover, it can be postulated that the rotation speed of the drive device lies between the minimum rotation speed and the maximum rotation speed. Also in this case, the minimum rotation speed is greater 0, whereas the maximum rotation speed exceeds the minimum rotation speed.

In addition, or as an alternative, the preconditions described in the context of integration can be used so that at least one of the following conditions have to be met: The exhaust mass flow changes, the exhaust temperature exceeds a first temperature threshold value, the exhaust temperature drops below a second temperature threshold value, the exhaust mass flow exceeds a first mass flow threshold value, the exhaust mass flow is smaller than a second mass flow threshold value, an exhaust mass flow integral is greater than an exhaust mass flow integral threshold value. Conversely, it is, of course, also possible to use at least one of the conditions described in the context of the diagnostic mode for determination as to whether integration should be carried out.

According to another aspect of the present invention, an exhaust emission control device, in particular for carrying out the method as described above, includes a particulate filter, and pressure sensors configured to determine the presence of an actual pressure loss across the particle sensor, with the exhaust emission control device being configured: to determine a model pressure loss as a function of a state variable, to determine a pressure quotient as a function of the actual pressure loss and the model pressure loss, and to ascertain a condition of the particulate filter in a diagnostic mode in response to the pressure quotient.

The benefits of the afore-described procedure or configuration of the exhaust emission control device have already been discussed. Both, the exhaust emission control device and the method can be refined in accordance with the afore-described configurations.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the figures may not necessarily be to scale. In certain instances, details which are not necessary for an understanding of the present invention or which render other details difficult to perceive may have been omitted.

Figure 1:
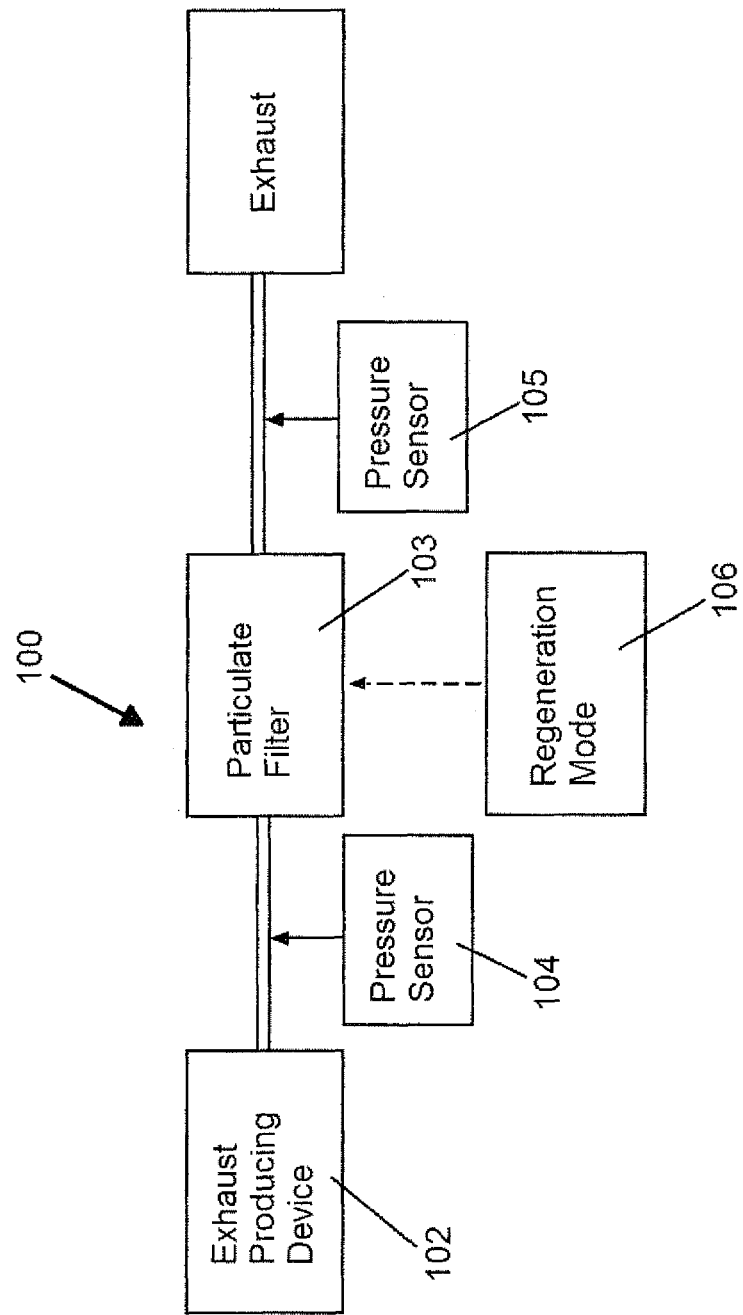
FIG. 1 is a schematic illustration of an exhaust emission control device according to the present invention.

Turning now to FIG. 1, there is shown a schematic illustration of an exhaust emission control device according to the present invention, generally designated by reference numeral 100. The exhaust emission control device 100 includes a particulate filter 103 to filter out particles from exhaust gas which flows through the exhaust emission control device 100. The exhaust emission control device 100 can be a component of a drive device which includes an exhaust-producing device 102, such as an internal combustion engine, in addition to the exhaust emission control device 100.

Figure 2:
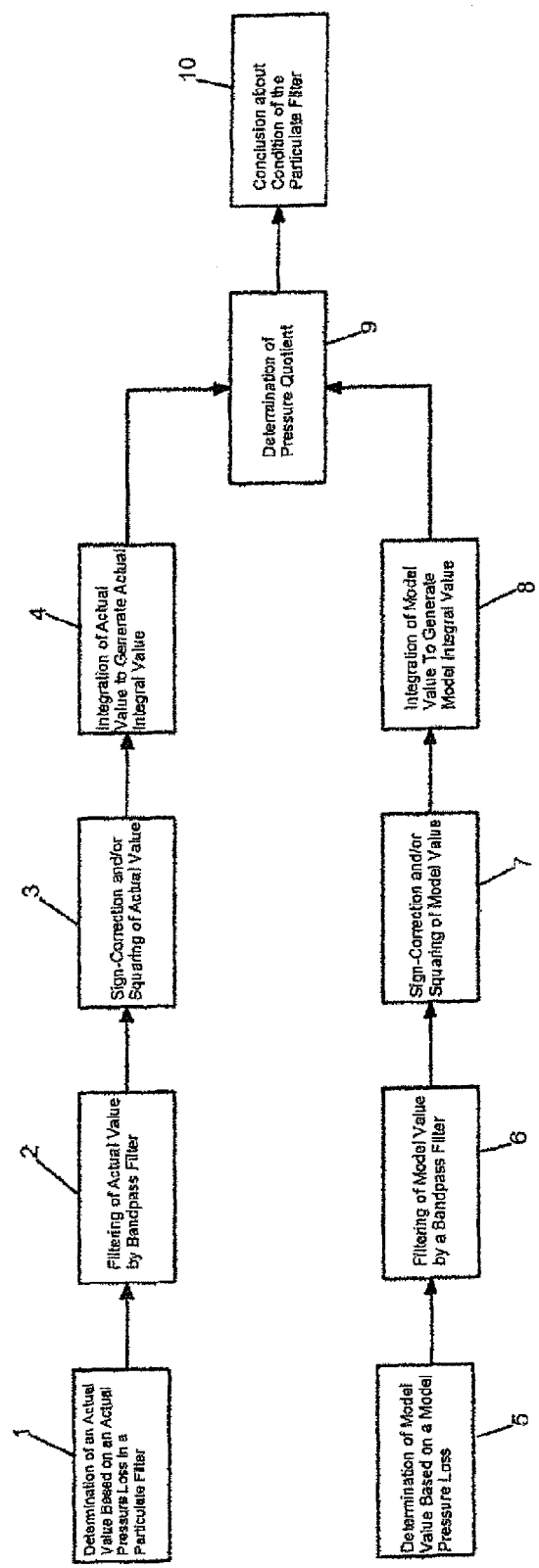
FIG. 2 is a flow chart of a method of operating an exhaust emission control device according to the present invention.

FIG. 2 shows a flow chart of a method of operating an exhaust emission control device according to the present invention.

In a first step 1, provision is initially made to determine an actual pressure loss across the particulate filter 103 with the aid of pressure sensors 104, 105 (FIG. 1). For that purpose, provision can be made to measure the pressure upstream and downstream of the particulate filter 103 and then to determine the actual pressure loss on the basis of a differential between these pressures. In step 1, the determined actual pressure loss 1 is interpreted as equal to an actual value. In a step 2, the actual value is filtered by a band pass filter, i.e. routed through a bandpass filter. The actual value determined in this way is sign-corrected and/or squared in a step 3 and then integrated in step 4 over time to produce an actual integral value.

Integration is executed only when one or more of the following conditions is met: The exhaust mass flow changes, the exhaust temperature exceeds a first temperature threshold value, the exhaust temperature drops below a second temperature threshold value, the exhaust mass flow exceeds a first mass flow threshold value, the exhaust mass flow is smaller than a first mass flow threshold value, an exhaust mass flow integral is greater than a threshold value of an exhaust mass flow integral.

In an analogous manner, a model pressure loss is determined in step 5 on the basis of at least one state variable. The state variable may, for example, be the exhaust mass flow. Another example of a state variable for determination of the model pressure loss may involve the exhaust temperature for example. The model pressure loss is, for example, a function of the exhaust mass flow and/or the exhaust temperature. The model pressure loss is interpreted as model value.

This model value undergoes in step 6 filtering by a bandpass filter, with the bandpass filter having a same passband range, i.e. same lower limit and same upper limit of the passband range, as the bandpass filter used in step 2. The determined model value is sign-corrected and/or squared in a step 7, using a same procedure as applied for the actual value in step 3. The thus determined model value is integrated in step 8 over time to produce a model integral value. Provision may also be made for the model integral value to carry out integration only when at least one of the afore-stated conditions, as applied in the context of the integration of the actual value, is met. Advantageously, integration of the model value is carried out, when integration of the actual value has been executed.

In step 9, a pressure quotient is determined through division of the actual integral value by the model integral value. In response to the determined pressure quotient, a conclusion can be made about the condition of the particulate filter 103. For example, when the pressure quotient is smaller than a first limit value, it follows that a mechanical defect of the particulate filter is present or that the particulate filter has been removed. Conversely, when the determined pressure quotient is greater than a second limit value, it follows that the particulate filter is highly loaded. When the particulate filter 103 is highly loaded, it is provided for example to execute a regeneration mode 106 (FIG. 1). Advantageously, the first limit value is smaller than 1, whereas the second limit value is greater than one. In particular, the second limit value is greater than the first limit value.

The afore-described mode of operation results in a highly reliable diagnostic of the particulate filter so that a high load and/or defect of the particulate filter can be recognized rapidly and efficiently.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method of operating an exhaust emission control device of a motor vehicle, comprising:
   determining an actual pressure loss across a particulate filter wherein an actual value is associated with the actual pressure loss;
   determining a model pressure loss as a function of a state variable, wherein a model value is associated with the model pressure loss;
   forming a model integral value from the model value as a function of time;
   forming an actual integral value from the actual value as a function of time;
   determining a pressure quotient as a function of the actual integral value and the model integral value;
   ascertaining a condition of the particulate filter in a diagnostic mode as a function of the pressure quotient; and
   communicating the ascertained condition of the particulate filter to a user of the motor vehicle or executing a regeneration mode of the particulate filter when the pressure quotient exceeds a predetermined value.

2. The method of claim 1, further comprising filtering the model value and/or the actual value by a bandpass filter before determining the pressure quotient.

3. The method of claim 2, wherein the bandpass filter has a lower limit of a passband range of 0.1 Hz to 1 Hz and/or an upper limit of the passband range of 1 Hz to 10 Hz.

4. The method of claim 1, further comprising sign correcting or squaring the model value and/or the actual value before determining the pressure quotient.

5. The method of claim 1, further comprising ascertaining a mechanical defect of the particulate filter or a removal of the particulate filter, when the pressure quotient is less than a first limit value.

6. The method of claim 1, further comprising ascertaining a high load of the particulate filter, when the pressure quotient exceeds a second limit value.

7. The method of claim 1, further comprising executing the diagnostic mode when at least one of the following conditions is satisfied:
   an observation time exceeds a minimum observation time,
   an integration time period exceeds a minimum integration time period,
   a drive torque of a drive device exceeds a minimum torque,
   a drive torque of a drive device is smaller than a maximum torque,
   a rotation speed of the drive device exceeds a minimum rotation speed, and
   a rotation speed of the drive device is smaller than a maximum rotation speed.

8. An exhaust emission control device of a motor vehicle, comprising:
   a particulate filter; and
   pressure sensors configured to determine an actual pressure loss across the particulate filter,
   said exhaust emission control device being configured to:
      determine a model pressure loss as a function of a state variable, wherein an actual value is associated with the actual pressure loss,
      determine a pressure quotient as a function of the actual pressure loss and the model pressure loss, wherein a model value is associated with the model pressure loss,
      form a model integral value from the model value as a function of time;
      form an actual integral value from the actual value as a function of time;
      ascertain a condition of the particulate filter in a diagnostic mode as a function of the pressure quotient; and
      communicate the ascertained condition of the particulate filter to a user of the motor vehicle or execute a regeneration mode of the particulate filter when the pressure quotient exceeds a predetermined value.

* * * * *